United States Patent [19]

Shibata et al.

[11] Patent Number: 4,724,002

[45] Date of Patent: Feb. 9, 1988

[54] HEAT-SENSITIVE TRANSFER MEDIA

[75] Inventors: Tomoo Shibata, Irvine; Otto Ondruska, Santa Ana, both of Calif.

[73] Assignee: Ricoh Electronics, Inc., Santa Ana, Calif.

[21] Appl. No.: 857,054

[22] Filed: Apr. 29, 1986

[51] Int. Cl.$^4$ ............................................. C09D 11/12
[52] U.S. Cl. ....................................... 106/31; 106/23; 106/272; 106/308 Q; 106/309
[58] Field of Search ............... 106/23, 31, 308 Q, 272, 106/309

[56] References Cited

U.S. PATENT DOCUMENTS

| | | | |
|---|---|---|---|
| 3,086,873 | 4/1973 | Steinbrunner | 106/24 |
| 4,251,276 | 2/1981 | Ferree, Jr. et al. | 106/27 |
| 4,269,892 | 5/1981 | Shattuck et al. | 428/337 |
| 4,304,601 | 12/1981 | Sharp | 106/22 |
| 4,366,271 | 12/1982 | Riegler | 523/333 |
| 4,395,718 | 7/1983 | Murayama et al. | 346/135.1 |
| 4,403,550 | 9/1983 | Sharp | 101/452 |
| 4,404,249 | 9/1983 | Margerum et al. | 428/216 |
| 4,427,810 | 1/1984 | Chisvette et al. | 106/22 |
| 4,503,095 | 3/1985 | Seto et al. | 427/265 |
| 4,513,107 | 4/1985 | Fabbrini | 524/56 |

*Primary Examiner*—Amelia Burgess Yarbrough
*Attorney, Agent, or Firm*—Walter A. Hackler

[57] ABSTRACT

A process is provided for the manufacture of heat-sensitive, heat-transferred media which includes a solid wax binder pigment and additives. The process provides for the mixing of molten wax binder with a mixture of pigment and water to transfer the pigment from the water into the molten wax binder as particulates. The water is separated and removed from the wax and the pigment-ladened binder mixed with additives such as Tergitol, tall oil and Cosperse to produce a heat-sensitive transfer media. When coated on a polymer backing, the heat-transfer media had a very fine pigment particulate size.

22 Claims, No Drawings

HEAT-SENSITIVE TRANSFER MEDIA

The present invention is directed to thermal printing and, more particularly, directed to a heat-sensitive transfer media to facilitate such printing.

Printing through the use of heat, rather than mechanical impact, has a number of advantages. Thermal printing, for example, eliminates the need for messy inks, or ink-impregnated ribbons, which are many times awkward to handle and change in the printing apparatus.

Secondly, mechanical impact-type printing usually involves quite complicated mechanizations in order to properly create images through an impregnated ribbon utilizing solid alphanumeric characters, or a dot-matrix system.

An additional advantage of thermal printing is its relatively noise-free operation. This can be quite important where a number of machines are employed in the same area.

In thermal printing, a heat transfer media, such as heat-sensitive process ink disposed on a plastic, or paper, ribbon is utilized with a thermal print head. The thermal print head heats selected portions of the ribbon, thereby causing the heat-sensitive ink, or heated portions, to melt, or soften, and transfer onto paper, or other objects to be printed.

Typically, the heat-sensitive ink comprises a binder which is solid at room temperature, but is softened or fluid above about 60° C. The melt and flow characteristics of the process ink are controlled by a number of additives in order to impart physical properties to the ink to enable complete transfer of the ink, when heated, from the ribbon, or substrate, to the paper stock, or object to be printed.

A number of binders have been utilized in heat-sensitive medias including waxes, such as carnauba waxes, microcrystalline wax, haze wax, beeswax, ceresine wax, spermaceti, polyethylene and oxidized polyethylene.

Since the binder itself usually is colorless, a pigment is suspended within the binder to impart color to the ink. A number of pigments are suitable for thermosensitive process inks which range in color and include black, magenta, cyan and yellow, among others.

In the last stages of pigment manufacture, the pigment is precipitated from solutions and then passed through a filter press to produce what is commonly called "presscake", which may contain up to 80% water.

To increase the density of the pigment, the presscake is typically added into an oil-based vehicle and is vigorously mixed at a temperature between about 60 and about 100° C. to "flush" the water out of the pigment and cause the pigment to enter the oil phase.

In the trade, the pigment-laden oil is typically referred to as "dry color" or "flush".

In the manufacture of the heat-sensitive ink, this flush is then added to a binder along with other additives to form a heat-sensitive transfer media, which is typically applied to a ribbon substrate, or the like.

It should be appreciated that the pigment is present in the binder as particulates and color image quality and clear definition of the images to be printed is in part dependent upon the pigment particulate size in the heat-sensitive process ink.

This is particularly important in dot-matrix-type printing.

Current state-of-the-art thermal print heads are capable of defining 400 dots per inch, i.e., they are capable of individually heating 400 points per inch along a heat-sensitive transfer media. Hence, a single dot may have a dimension of approximately 0.0635 millimeters.

As technology improves in the thermal print head area, it is expected that smaller dot sizes may be achieved. It should also be apparent that dot size and dot density are directly related to the image quality produced by a dot matrix thermal print head.

Heretofore, the heat-sensitive transfer media has included pigment with a particle size of up to 0.1 millimeter in size and pigment concentration of at most about 15 percent by weight. Clearly, this heat-sensitive transfer media cannot take full advantage of the state-of-the-art thermal print heads, which have a capability of printing up to 400 dots per inch.

Hence, there is a need for heat-sensitive transfer media having a pigment particulate size and concentration sufficient to enable image quality as may be afforded by the state-of-the-art thermal print heads and for accommodating thermal print heads which may be developed having even a greater dot density capability.

The present invention is for a process for manufacturing a heat-sensitive transfer media which includes pigment having a very small particular size, suspended in a binder, and the product made by this process.

While conventional elements of the present heat-sensitive transfer media may be known in the art, it is the process itself which creates the fine particulate pigment dispersion in the binder, which has been discovered.

SUMMARY OF THE INVENTION

In accordance with the process of the present invention for the manufacture of a heat-sensitive transfer media, a solid wax binder is heated to form a molten-wax binder and a mixture of pigment and water is provided and added to the molten wax binder.

Thereafter, the molten wax binder and the mixture of pigment and water are agitated under conditions of temperature and pressure suitable for causing the pigment to leave the water and disperse as particulates in the molten wax binder.

The water is separated from the molten wax binder and additives are blended with the molten wax binder to form a molten heat-sensitive transfer media.

Thereafter, the molten heat-sensitive transfer media is cooled to form a solid heat-sensitive transfer media.

The conditions suitable for causing the pigment to transfer from the water and disperse in the molten wax binder include maintaining a temperature sufficient to keep the wax binder in the molten state at atmospheric, or reduced pressure. In addition, the molten heat-sensitive transfer media may be coated onto a suitable substrate for the cooling thereof.

Specifically, the process in accordance with the present invention may utilize a carnauba wax derivative as binder and the temperature during mixing is maintained about 90° C.

The mixture of pigment and water, or presscake, suitable for the process of the present invention may include about 30% by weight pigment and about 70% by weight water.

The process of the present invention is distinguished over prior art processes by the method in which the pigment is incorporated into the binder to produce a very fine particulate pigment therein.

Typically, prior art processes for the manufacture of a wax binder heat-sensitive transfer media, utilize oil-based pigment, or dry color. This dry color is added to the molten wax binder and agitated to disperse the pigment therein. This results in significantly larger pigment particulates in the wax binder as will be hereinafter documented.

More specifically, the process in accordance with the present invention includes utilizing additives, such as tall oil, Tergitol wetting agents and Cosperse 7000, the additives being added as hereinafter discussed, to enhance the transfer of the qualities of the heat-sensitive transfer media.

In the present process, the mixture of pigment and water is added in an amount sufficient to result in a heat-sensitive transfer ink having up to about 60% by weight pigment.

When a wetting agent such as Tergitol 15-S-7 or Tergitol TMN6 and tall oil are utilized as additives, they may be added in an amount to result in a heatsensitive transfer ink having about 70% by weight binder, 10% by weight pigment, 10% by weight tall oil and about 10% by weight Tergitol.

The advantage of the process of the present invention is that the resulting heat-sensitive transfer media comprises pigment having a particle size of less than about 0.06 millimeters and as small as about 1.0 micron, with pigment concentration up to about 60% by weight, and the product of the process of the present invention is considered part of the present invention.

DETAILED DESCRIPTION OF THE INVENTION

According to the present invention, the process for manufacturing heat-sensitive transfer media and the resulting heat-transfer media are provided.

The composition of the heat-sensitive transfer media comprises a suitable wax binder, such as carnauba wax, carnauba wax derivatives, microcrystalline wax, haze wax, beeswax, ceresine wax, or spermaceti.

Specifically, the heat-sensitive transfer media may comprise carnauba wax, flake No. 3, available from Vivion Chemical Corporation, wax S or KSL wax, available from American Hoechst.

Suitable additives useful in the present invention are Tergitol 15-S-7, Tergitol TMN-6, available from Union Carbide; or Actinol FA3, tall oil, available from Arizona Chemical; 2-Ethoxyethanol, available from Union Carbide Corporation; and Cosperse-7000, available from U.C.I. Americas.

While any number of additives may be useful, it has been found that Tergitol 15-S-7 enhances the complete transfer of the ink from the substrate onto the paper when activated by heat, and the Cosperse-7000 is added as a viscosity builder to enable a smooth coating and cohesion of the ink onto the paper, or object to be printed.

The 2-Ethoxyethanol is added as an emulsifier/ stabilizer for the binder.

It is of utmost importance that the pigment particle size suspended in the binder is suitable for the advantage of enabling printheads having a dot size of about .0635 millimeters, hence, the particle size is preferably less than about 0.06 millimeter.

It has been found that the condition necessary to achieve this particulate pigment size is to maintain the wax in a molten state, in the case of carnauba wax, about 90° C., while vigorously mixing and adding presscake into the wax. While the hereinafter set forth examples were made utilizing a temperature of approximately 90° at atmospheric pressure, it is not intended to limit the invention thereto. The effects of higher temperatures and pressures may result in varying pigment particulate size, although investigation of this range of perimeters is not presented herein.

The range of temperatures suitable for carrying out the present invention is between the melting point of the wax and the decomposition temperature of the particular pigment utilized.

Any number of pigments may be utilized in presscake form in the present invention. Specific ones that have been found to be useful include Sunfast blue, NC-449-1281, lemon metallic yellow (AAOA) presscake 475-0586 S 15002 and lithol rubine (red) presscake No. 419-04191 T15228, all available from Sun Chemical of Cincinnati, Ohio.

It is to be appreciated that the pigment formulations are in many cases trade secrets of the companies providing them, however, the identified pigments herein are commercially available. In these presscake pigments the water content ranges between 50% to 80% by weight.

Pigment concentrations may vary depending upon the density of a particular pigment and generally are between about 5 and about 15% by weight pigment in the heat-sensitive transfer media.

EXAMPLE 1

Carnauba wax was heated to about 90° C. and thereafter Sunfast blue pigment presscake having a water-content of 65.6% was added thereto and the liquid mixture agitated with a 2000 RPM mixer to cause the pigment to leave the water phase and enter the wax as a particulate, some of the water separated by evaporization and the remainder separated by applying a vacuum to the mixture.

Thereafter, the pigment laden wax was mixed with tall oil (Actinol FA3) and Tergitol TMN-6 and coated on a polymer substrate and allowed to cool.

The composition of the heat-sensitive transfer media was 65% by weight carnauba wax, 11% by weight Cosperse-7000, 7% by weight tall oil, 7% by weight Tergitol TMN-6, and 10% Sunfast blue pigment.

The coating was air cooled to room temperature (22° C.) in about 5 to about 10 seconds. After the coating had cooled, it was observed under a microscope and the particle size and distribution documented. It was found that the pigment particulate size was less than about 0.06 mm.

Under examination with a Leeds and Northrop Instruments MICROTRACK particle size analyzer, the pigment particulate size was found to be about 1.0 micron. (80%–1.1 micron, distribution, 3%–0.2 micron, 4%–6.0 micron).

EXAMPLE 2

The process set forth in Example 1 in which the Sunfast blue was added in amounts resulting in the heat-sensitive transfer media having a concentration of between 5% and 60% by weight pigment, 11% by weight Cosperse-7000, 7% by weight tall oil, 7% by weight Tergitol TMN-6 and correspondingly 70% to 15% carnauba wax.

Microscope examinations showed that the particle size of the pigment was less than about 0.06 mm.

Under examination with a Leeds and Northrop Instruments MICROTRACK particle size analyzer, the pigment particulate size was found to be about 1.0 micron. (Distr. similar to Example 1).

Similar results were found when the presscake utilized was lithol rubine (red) and lemon metallic yellow.

EXAMPLE 3

The process set forth in Example 1 was carried out utilizing wax S, tall oil and Tergitol TMN-6, to result in a heat-sensitive transfer media having a composition of 70% by weight wax S, 10% by weight tall oil, (Actinol FA3), 10% by weight Tergitol TMN-6, and 10% by weight pigment.

After the coating had cooled, it was observed under a microscope and the particle size and distribution documented. It was found that the pigment particulate size was less than about 0.06 mm.

Under examination with a Leeds and Northrop Instruments MICROTRACK particle size analyzer, the pigment particulate size was found to be about 1.0 micron. (Distr. similar to Example 1).

EXAMPLE 4

The process set forth in Example 3 can be carried out utilizing KSL wax, tall oil and Tergitol TMN-6 to result in a final heat-sensitive transfer media having a composition of 70% by weight KSL wax, 10% by weight tall oil (Actinol FA3), 10% by weight Tergitol TMN-6 and 10% by weight pigment.

It is expected that particle size analysis would show a pigment particulate size of about 1.0 micron. (Distr. similar to Example 1).

EXAMPLE 5

Carnauba wax was heated to about 50° C. and thereafter Sunfast blue pigment dry color was added thereto and the liquid mixture agitated with a 2000 RPM mixer.

Thereafter, the pigment laden wax was mixed with tall oil and Tergitol TMN-7 and air cooled on a polymer substrate.

The final composition of the heat-sensitive transfer media was 65% by weight carnauba wax, 11% by weight Cosperse-7000, 7% by weight tall oil, 7% by weight Tergitol TMN-7 and 10% Sunfast blue pigment.

After the coating had cooled, it was observed under a microscope and the particle size and distribution documented. It was found that there were between 60 and 100 pigment particles per square inch having a particle size greater than 0.06 mm and the maximum particle size was about 0.1 mm.

The method of making a heat transfer media according to prior art technique as illustrated in Example 5, results in large pigment particulates in the end product compared to the pigment particulate size found in heat-sensitive transfer media made in accordance with the present invention as illustrated in Examples 1-4.

Although there has been described hereinabove a specific process for the manufacture of heat-sensitive transfer media and the product of the process for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the invention as defined in the appended claims.

What is claimed is:

1. A process for the manufacture of a solid heat-sensitive transfer media comprising:

providing a mixture of pigment and water;

heating solid wax binder to form molten wax binder;

adding the mixture of pigment and water to the molten solid wax binder;

mixing the molten wax binder and the mixture of pigment and water under conditions of temperature and pressure suitable for causing pigment to leave the water and disperse as particulates in the molten wax binder;

separating the water from the molten wax binder with pigment particulates therein;

blending additives with the molten wax binder to form a molten heat-sensitive transfer media; and cooling the molten heat-sensitive transfer media to produce a solid heat-sensitive transfer media having pigment particulates therein with a maximum size of about 0.06 mm.

2. The process in accordance with claim 1 wherein the conditions suitable for causing pigment to leave the water and disperse in the molten wax binder include maintaining a temperature sufficient to keep the wax binder in the molten state at atmospheric pressure.

3. The process in accordance with claim 1 further comprising the step of coating the molten heat-sensitive transfer media onto a substrate before cooling thereof.

4. The process in accordance with claim 2 wherein the wax binder comprises carnauba wax and the temperature during mixing is maintained at about 90° C.

5. The process in accordance with claim 4 wherein the mixture of pigment and water comprises about 20 percent by weight pigment and about 80 percent by weight water.

6. The process in accordance with claim 1 wherein the suspension of pigment in water is added in an amount sufficient to result in a heat-sensitive transfer ink having up to about 60 percent by weight pigment.

7. The process in accordance with claim 6 wherein the suspension of pigment in water is added in an amount sufficient to result in a heatsensitive transfer ink having between about 5 percent and about 15 percent by weight pigment.

8. The process in accordance with claim 1 wherein the heat-sensitive transfer media comprises pigment having a particle size of about one micron.

9. The process in accordance with claim 1 wherein the molten heat-sensitive transfer media is cooled at a rate between about 14 degrees centigrade per second to about 7 degrees centigrade per second.

10. The heat-sensitive transfer media made in accordance with the process of claim 1.

11. The heat-sensitive transfer media made in accordance with the process of claim 1.

12. The heat-sensitive transfer media made in accordance with the process of claim 8.

13. A process for the manufacture of a solid heat-sensitive transfer media using presscake pigment comprising:

heating solid wax binder to produce molten wax binder;

adding presscake comprising pigment in water to the molten wax binder;

mixing the molten wax binder and presscake under conditions of temperature and pressure suitable for causing pigment to leave the water and disperse as particulates in said molten wax binder;

allowing the water and the pigment laden molten wax binder to separate;

removing the separated water from the pigment laden molten wax binder;

blending additives with the pigment laden molten wax binder to form a molten heat-sensitive transfer media; and cooling the molten heat-sensitive transfer media at a rate resulting in a solid heat-sensitive transfer media.

14. The process in accordance with claim 13 wherein the conditions suitable for causing pigment to leave the water and disperse in the molten wax binder include maintaining a temperature sufficient to keep the wax binder in the molten state at atmospheric pressure.

15. The process in accordance with claim 13 further comprising the step of coating the molten heat-sensitive transfer media onto a substrate before cooling thereof.

16. The process in accordance with claim 14 wherein the wax binder comprises carnauba wax and the temperature during mixing is maintained at about 90° C.

17. The process in accordance with claim 14 wherein the presscake comprises about 20 percent by weight pigment and about 80 percent by weight water.

18. The process in accordance with claim 13 wherein an amount of presscake is added to result in a heat-sensitive transfer ink having up to about 60 percent by weight pigment.

19. The process in accordance with claim 18 wherein an amount of presscake is added to result in a heat-sensitive transfer ink having between about 5 percent and about 15 percent by weight pigment.

20. The process in accordance with claim 13 wherein the molten heat-transfer media is cooled at a rate between about 14 degrees centigrade per second to about 7 degrees centigrade per second.

21. The heat-sensitive transfer media made in accordance with the process of claim 13.

22. The heat-sensitive transfer media made in accordance with the process of claim 13.

* * * * *

UNITED STATES PATENT AND TRADEMARK OFFICE
CERTIFICATE OF CORRECTION

PATENT NO. : 4,724,002

DATED : February 9, 1988

INVENTOR(S) : Tomoo Shibata and Otto Ondruska

It is certified that error appears in the above-identified patent and that said Letters Patent is hereby corrected as shown below:

In Claim 22, line 2 thereof, delete "13"

and insert therefor --20--.

Signed and Sealed this

Nineteenth Day of July, 1988

Attest:

DONALD J. QUIGG

Attesting Officer

Commissioner of Patents and Trademarks